Patented Oct. 23, 1928.

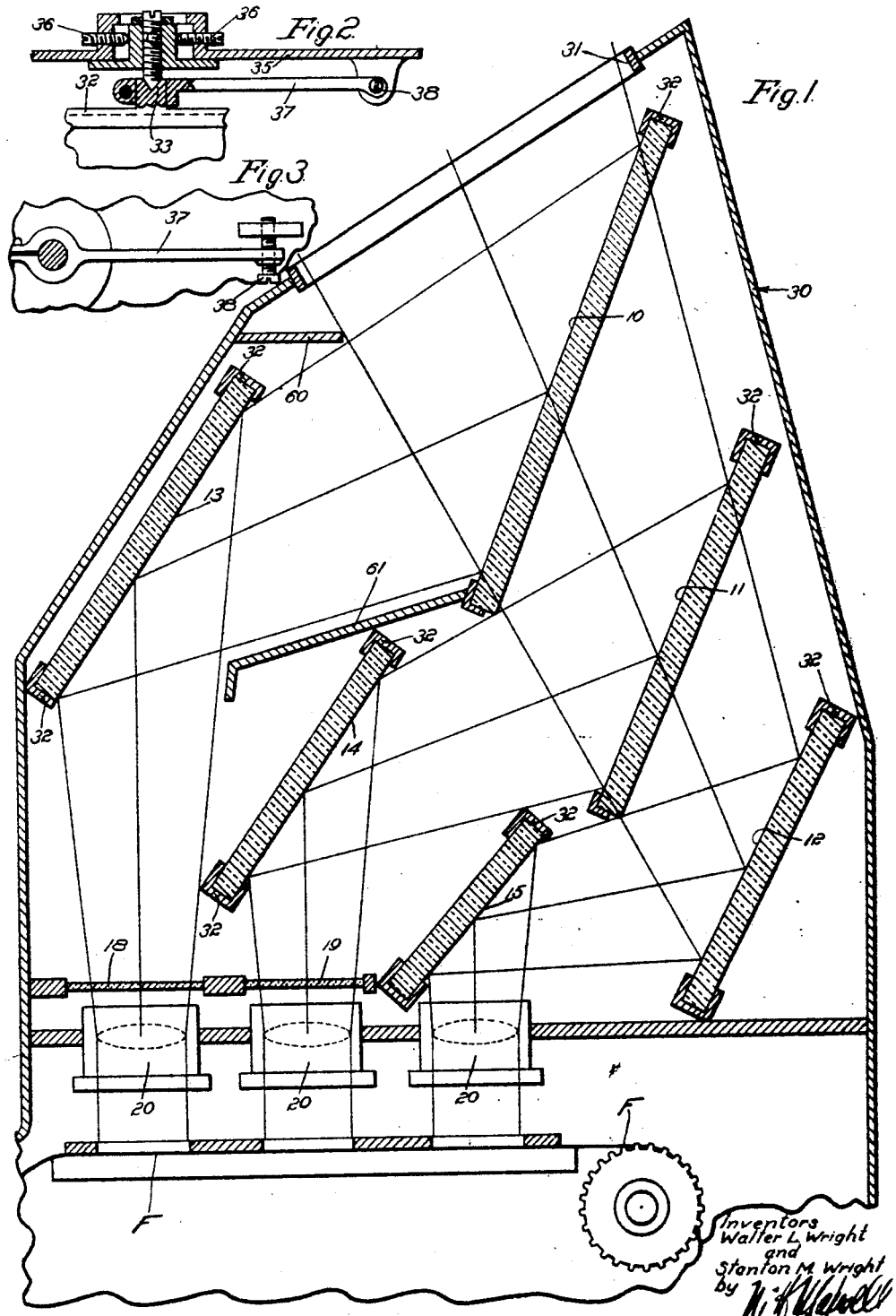

1,688,606

UNITED STATES PATENT OFFICE.

WALTER L. WRIGHT, OF SANTA MONICA, AND STANTON M. WRIGHT, OF LOS ANGELES, CALIFORNIA.

OPTICAL SYSTEM.

Application filed June 1, 1926. Serial No. 112,968.

This invention has to do with an optical system and has particular reference to an optical system for use in motion picture photography.

Color photography, and particularly color photography as applied to motion pictures, has been the subject of extensive research and experimentation. Various optical systems have been developed for use in color photography and certain of these systems have been more or less successful in the taking of ordinary or still pictures. In attempting to obtain color motion pictures certain practical and commercial difficulties or limitations have been encountered which have not as yet been completely overcome. For instance in the case of motion pictures the film must, for commercial reasons, be in one continuous strip and of a certain definite size, and for optical or photographic reasons the lenses used must be within certain limits as to focal length and speed. For instance, for practical motion picture photography lenses of comparatively short focal length must be employed in order that the pictures produced have the foreground and background in the proper perspective and definition. In practice the standard focal length for motion picture photography is fifty millimeters.

In practice satisfactory color motion pictures can be projected from a film carrying a plurality, for instance three, images of equal size and of different color values of a subject in spaced relation on the film, the spacing being equal at least to one picture area and the adjacent series of pictures being overlapped so that the entire film area is occupied thus avoiding loss of film area. The spacing of the several different images of a series permits of the images being toned different colors so that the projected pictures appear in natural color, and allows for the proper spacing of projecting lenses, etc. such as are used in standard methods of projection. A film or arrangement of images such as we refer to is set forth in our co-pending application, Serial No. 685,980, filed January 14, 1924.

It is an object of this invention to provide an optical system for the taking of motion pictures in an arrangement and of the character set forth in the above mentioned co-pending application.

It is another object of this invention to provide an optical system for a camera to obtain a plurality of spaced pictures of equal size on a single film arranged in a single plane with the lens means behind the light dividing means.

It is a primary object of our invention to provide a combination of light dividing means, film, and lenses, which makes it possible in practice to obtain simultaneously on a film held in a fixed plane three spaced pictures of equal size using lenses that are within the limits necessary for practical motion picture photography.

The various objects and features of our invention will be best and more fully understood from the following detailed description of a typical preferred embodiment of the invention throughout which description reference is had to the accompanying drawings, in which:

Fig. 1 is a more or less diagrammatic sectional view illustrating a camera embodying the optical system provided by this invention; and Figs. 2 and 3 are views illustrating construction that may be employed in carrying out the invention.

In accordance with the general principles of our invention we divide a shaft of light from a subject into a plurality of parallel spaced shafts of light different chromatically and equal in size, and we arrange lenses in said spaced shafts of light whereby a plurality of images of different chromatic values are obtained simultaneously in spaced relation on a strip of film in a single plane. In carrying out my invention I first pass the light through a reflector and light filtering system to produce the spaced shafts of light above mentioned.

The reflector system provided for obtaining the spaced like parallel shafts of light includes, generally, three primary reflectors 10, 11, and 12, and three secondary reflectors 13, 14, and 15. The light from the subject first falls on the first primary reflector 10. A portion of the light is reflected by the reflector 10 onto the first secondary reflector 13, the remaining portion of the light passess through the reflector 10 and falls on the second reflector 11 which reflects off a portion of it onto the second reflector 14. The light which is not reflected off by the reflector 11 passes on through the reflector 11 and falls on the third primary reflector 12 which reflects it onto the third secondary reflector 15. The three primary reflectors are of different sizes;

the second reflector 11 is smaller than the first reflector 10, and the third reflector 12 is smaller than the second reflector 11. This variation in size of the reflectors 10, 11, and 12, provides for a corresponding difference in size in the reflectors 13, 14, and 15, as will be hereinafter described. The first and second primary reflectors 10 and 11 may be in the form of glass plates having their front surface polished to a degree to reflect off the desired amount of light. The third primary reflector 12 may be a front surface reflector of any suitable character. The secondary reflectors 13, 14, and 15, are all front surface reflectors. The primary reflectors 10, 11, and 12, are angularly disposed in the path of the light from the subject in the same general manner so that they reflect off the light as above described in the same general direction onto the secondary reflectors 13, 14, and 15. In accordance with our invention the secondary reflectors 13, 14, and 15, are angularly disposed in the same general manner oppositely the reflectors 10, 11, and 12, respectively, and are spaced different distances from the primary reflectors. Further, the three secondary reflectors vary in size, the second reflector 14 being smaller than the first reflector 13 and the third reflector 15 being smaller than the second reflector 14. In accordance with the arrangement and relationing provided by our invention the larger or first secondary reflector is arranged in an angular position in the path of light reflected by the first primary reflector 10 and at a point substantially removed or spaced from the reflector 10. The second secondary reflector 14 is arranged in an angular position in the path of light reflected by the second primary reflector 11. The second secondary reflector 14 is closer to the reflector 11 than the first secondary reflector is to the reflector 10. The third secondary reflector 15 is arranged in an angular position in the path of light reflected by the reflector 12 and is located comparatively close to the reflector 12. A motion picture film F is arranged in a single plane in the path of the light reflected by the secondary reflectors and lenses 20 are located between the secondary reflectors and film. As a result of the differentiation in size and spacing of the various reflectors we can arrange and relate the reflectors, lenses, and films to obtain three like spaced parallel shafts of light from a single or common shaft of light without interference from the reflectors or their mountings. By locating the lenses between the secondary reflectors and film we can use lenses of focal lengths practical for taking motion pictures.

The lens devices 20 may be standard lens devices such as are used in motion picture photography, for instance, they may be lenses having focal lengths of about fifty millimeters. They are, as above stated, arranged to receive and pass the light coming from the secondary reflectors 13, 14, and 15, to direct three shafts onto film F to make three spaced photographic images of exactly the same size and spaced apart on the film distances equal to one picture area.

The film F may be a standard motion picture film mounted or held in a suitable film gate or holding the mechanism and may be intermittently advanced in conjunction with a suitable shutter by mechanism or means well known in the art.

To obtain the desired chromatic differentiation between the light reflected or coming from the three secondary reflectors 13, 14, and 15, we may provide suitable filter means in or in combination with the reflectors. For instance we may make the body of the first primary reflector yellow to act as a yellow filter, the second primary reflector orange to act as an orange filter, and arrange a blue filter 18 in position to pass the light reflected by the first secondary reflector 13. A red filter 19 may be arranged to pass the light from the second secondary reflector 14. By this system or arrangement the light falling on the film from the first secondary reflector 13 is of violet values of the subject, the light falling on the film from the second secondary reflector 14 is of orange values of the subject, and the light falling on the film from the third secondary reflector 15 is of green values of the subject.

The reflector system, lenses and film are arranged in a suitable case or box like body 30 which has an opening 31 just sufficiently large to allow the desired light to enter and fall on the first primary light divider 10. The reflectors are in practice mounted in the case 30 so that they can be accurately adjusted to the proper spaced relation and angularity. In Figs. 2 and 3 of the drawings we illustrate a reflector mounting such as may be used. The reflector is in a frame 32 having aligned sockets 33 at opposite ends, and plates 35 are mounted in the case through adjusting screws 36 and carry pins which extend into the sockets to hold the frame. The frame may be turned through an arm 37 from a screw 38 and the general position or axis of the frame or reflector may be shifted by operation of the screws 36. Shields are provided in the case to prevent stray light reaching the film. With the arrangement and relationing of parts provided by our invention we place shields 60 and 61 in the case at the reflectors 10 and 13. The shield 60 is at the side of the reflector 13 adjacent the opening 31 and extends toward the reflector 10 as far as possible without interfering with the desired passage of the light. The shield 61 extends from the frame of the reflector 10 toward the reflector 13 past or back of the reflector 14 as far as possible without interfering with the light reflected by the reflector 13. With this arrangement the lenses and film are completely shielded. The shielding is aided by the reflectors 13, 14, and 15, being front surface reflectors, or in other words opaque.

Having described only a typical preferred form of our invention we do not wish to limit ourselves to the specific details set forth, but wish to reserve to ourselves any changes or variations that may appear to those skilled in the art or may fall within the scope of the following claims.

Having described our invention we claim:

In a motion picture camera for taking simultaneously three like equal size pictures of a subject in spaced relation on a strip of film held in a single plane including three primary reflectors angularly disposed and in spaced relation one behind the other in the path of light from the subject, the first two primary reflectors being transparent bodies with polished surfaces so that they reflect off some light and pass the rest, the three primary reflectors being different in size the first being largest and the last the smallest, three secondary reflectors each angularly disposed in the path of light reflected by the primary reflectors, the three secondary reflectors being of different size the one receiving light from the first primary reflector being the largest and the one receiving light from the last primary reflector being the smallest, and the three secondary reflectors being spaced different distances from their reflective primary reflectors the space between the first primary reflector and the secondary reflector receiving light from it being the greatest and the space between the last primary reflector and the secondary reflector receiving light from it being the smallest, three lenses each arranged in the path of light from a secondary reflector to direct the shaft of light onto the film, means whereby the shafts of light directed onto the film by the lenses are different chromatically, a casing surrounding the above named parts and having an opening to admit light from the subject to the primary reflectors, and light shielding means within the casing and in connection with the reflectors including a shield extending from a point adjacent the first primary reflector in the direction of the secondary reflector receiving light from the first primary reflector and back of the secondary reflector receiving light from the second primary reflector.

In witness that we claim the foregoing we have hereunto subscribed our names this 15th day of May, 1926.

WALTER L. WRIGHT.
STANTON M. WRIGHT.